(12) United States Patent
Suddreth et al.

(10) Patent No.: US 8,083,186 B2
(45) Date of Patent: Dec. 27, 2011

(54) INPUT/STEERING MECHANISMS AND AIRCRAFT CONTROL SYSTEMS FOR USE ON AIRCRAFT

(75) Inventors: John G. Suddreth, Cave Creek, AZ (US); Aaron Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 816 days.

(21) Appl. No.: 12/132,964

(22) Filed: Jun. 4, 2008

(65) Prior Publication Data

US 2009/0302172 A1 Dec. 10, 2009

(51) Int. Cl.
*B64C 13/50* (2006.01)
(52) U.S. Cl. ........ 244/236; 244/220; 244/221; 244/234; 244/237; 345/161; 700/85; 434/29
(58) Field of Classification Search .................. 244/234, 244/220, 221, 237, 236; 345/161; 700/85; 434/29
See application file for complete search history.

(56) References Cited

U.S. PATENT DOCUMENTS

| | | | |
|---|---|---|---|
| 4,638,131 A | 1/1987 | Kidd et al. | |
| 4,797,538 A | 1/1989 | Schick | |
| D346,997 S | 5/1994 | Kurtis | |
| 5,319,803 A | 6/1994 | Allen | |
| 5,431,569 A * | 7/1995 | Simpkins et al. | 434/29 |
| 6,264,146 B1 * | 7/2001 | Hill et al. | 244/234 |
| 6,360,149 B1 * | 3/2002 | Kwon et al. | 701/41 |
| 6,542,758 B1 | 4/2003 | Chennakeshu et al. | |
| 6,804,593 B2 * | 10/2004 | Kitano et al. | 701/41 |
| 6,939,066 B2 * | 9/2005 | Goodenough | 400/477 |
| 6,983,170 B2 | 1/2006 | Stulberger | |
| 7,017,704 B2 * | 3/2006 | Kapaan et al. | 180/315 |
| 7,236,355 B2 | 6/2007 | Kim | |
| 7,283,125 B2 * | 10/2007 | Martinez et al. | 345/168 |
| 2004/0007644 A1 * | 1/2004 | Phelps et al. | 244/17.11 |
| 2004/0078121 A1 * | 4/2004 | Cartmell et al. | 701/3 |
| 2007/0100523 A1 * | 5/2007 | Trachte | 701/41 |

OTHER PUBLICATIONS http://replay.waybackmachine.org/20070907135426/http://www.apple.com/ipodtouch/.*

* cited by examiner

*Primary Examiner* — Tien Dinh
*Assistant Examiner* — Justin Benedik
(74) *Attorney, Agent, or Firm* — Ingrassia Fisher & Lorenz, P.C.

(57) ABSTRACT

Input/steering mechanisms and aircraft control systems are provided. In an embodiment, by way of example only, an input/steering mechanism is provided for use with an aircraft control system. The input/steering mechanism includes a yoke that includes a hub, an alphanumeric keyboard, and a first grip surface. The alphanumeric keyboard is disposed on a face of the hub and is adapted to receive a manual input from a user and to transmit an output signal to the aircraft control system in response to the manual input. The first grip surface is formed on an outer periphery of the hub and is contoured to correspond with one or more fingers of the user, the first grip surface is formed such that a thumb of the user is positioned to rest in proximity to at least a portion of the alphanumeric keyboard when the one or more fingers grip the first grip surface.

29 Claims, 5 Drawing Sheets

INPUT/STEERING MECHANISMS AND AIRCRAFT CONTROL SYSTEMS FOR USE ON AIRCRAFT

TECHNICAL FIELD

The inventive subject matter generally relates to aircraft, and more particularly relates to input and steering mechanisms and aircraft control systems for use on aircraft.

BACKGROUND

Aircraft typically include one or more displays in a cockpit to visually present multiple categories of flight- and/or aircraft-related data from a flight control system to a flight crew. In some cases, the flight crew may be prompted by the displays to provide additional data to the flight control system for determining a particular command. In response, the flight crew may manually input data into the system by typing the data into an input device, such as a keyboard, or by pressing a button on a pointing device that may be communicatively coupled to the system. Typically, the input devices are located adjacent to the displays such that the flight crew may need to remove his hand from a yoke to operate the input device. As the number of components in the aircraft cockpit and the density of information presented on the displays continues to increase, improved systems are desirable that reduce effort of the flight crew with interacting with the displays and the flight control system.

Accordingly, it is desirable to have a simplified system for a flight crew to input data into a flight control system. In addition, it is desirable to for the system to be relatively inexpensive to implement into new and existing aircraft. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Input/steering mechanisms and aircraft control systems are provided.

In an embodiment, by way of example only, an input/steering mechanism is provided for use with an aircraft control system. The input/steering mechanism includes a first hub, at least a first portion of an alphanumeric keyboard, and a first grip surface. The at least a first portion of an alphanumeric keyboard is disposed on a face of the first hub and is adapted to receive a manual input from a user and to transmit an output signal to the aircraft control system in response to the manual input. The first grip surface is formed on an outer periphery of the first hub and is contoured to correspond with one or more fingers of the user. The first grip surface is disposed such that a thumb of the user is positioned to rest in proximity to the alphanumeric keyboard when the one or more fingers grip the first grip surface.

In another embodiment, by way of example only, the aircraft control system includes an input/steering mechanism, a processor, and a display. The input/steering mechanism includes a first hub, at least a first portion of an alphanumeric keyboard, and a first grip surface. The at least a first portion of an alphanumeric keyboard is disposed on a face of the first hub and is adapted to receive a manual input from a user and to transmit a first output signal to the aircraft control system in response to the manual input. The first grip surface is formed on an outer periphery of the first hub and is contoured to correspond with one or more fingers of the user. The first grip surface is disposed such that a thumb of the user is positioned to rest in proximity to the alphanumeric keyboard when the one or more fingers grip the first grip surface. The processor is in operable communication with the input/steering mechanism and is adapted to receive the first output signal from the input/steering mechanism and to produce a second output signal in response thereto. The display is in operable communication with the processor and is adapted to display an image in response to the second output signal therefrom.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
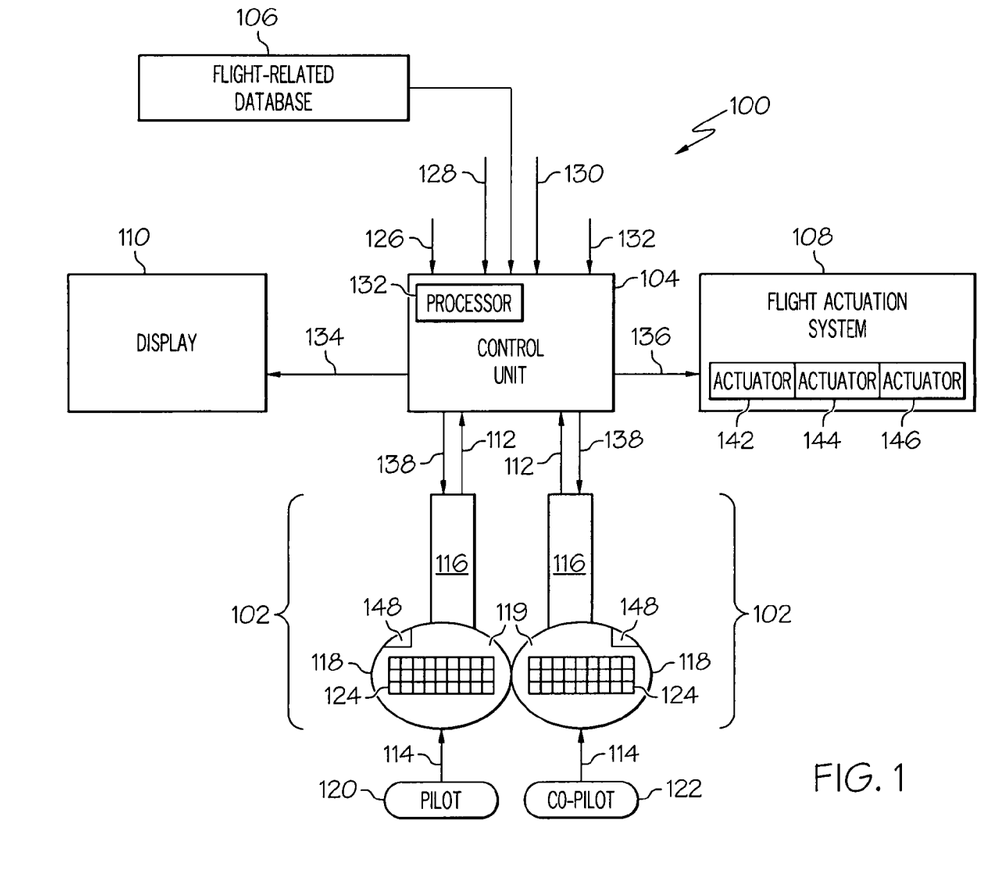
FIG. 1 is a functional block diagram of an aircraft control system, according to an embodiment.

FIG. 1 is a functional block diagram of an aircraft control system 100, according to an embodiment. The aircraft control system 100 includes one or more user input/steering mechanisms 102, a control unit 104, a flight-related database 106, a flight actuation system 108, and a display device 110. The one or more user input/steering mechanisms 102 are adapted to supply a flight control surface position control signal 112 to the control unit 104 and to allow a user (e.g., a pilot 120 or a co-pilot 122) to provide a user input 114 to the control unit 104. In an embodiment, the user input 114 may be a manual input to steer the aircraft in a particular direction. In such case, each user input/steering mechanism 102 may be made up of a steering mechanism 116 and a hub 118 coupled thereto. The steering mechanism 116 may be configured to move in various directions to allow the user to provide directional movement commands to the control unit 104. For example, the steering mechanism 116 may be rotatably movable, axially movable, and radially movable. In other embodiments, the steering mechanism 116 may be configured to move in other directions and manners. In this regard, the steering mechanism 116 may be a steering column, flight stick, joystick, or other movable device.

The hub 118 is disposed on the steering mechanism 116 and is adapted to provide a gripping area for the user to provide a manual input to the steering mechanism 116. In an embodiment, the hub 118 may be attached to the steering mechanism 116 such that movement of the hub 118 is directly translated thereto. Thus, when the user rotates or axially or radially moves the hub 118, the steering mechanism 116 exhibits a corresponding movement. In another embodiment, the hub 118 may be rotatably coupled to the steering mechanism 116. In such case, the user may rotate the hub 118 about a longitudinal axis through the steering mechanism 116 to cause the aircraft to bank left or right, or the user may pull up or push down on the hub 118 to cause the steering mechanism 116 to move axially or radially to impart another directional movement to the aircraft.

In another embodiment, the user input 114 may include a manual entry of textual and/or numerical data by the user. In this regard, the hub 118 also may include at least a portion of an alphanumeric keyboard 124 thereon that allows the user to input such data to the system 100. The alphanumeric keyboard 124 is implemented as part of the hub 118 and is disposed such that keystrokes may be made primarily using the user's thumbs, in an embodiment.

Although the input/steering mechanism 102 used by both the pilot 120 and the co-pilot 122 are shown in FIG. 1 as being substantially identical to each other, they may not be in other embodiments. For example, the steering mechanism 116 used by the pilot 120 may be a steering column, while the steering mechanism 116 used by the co-pilot 122 may be a flight stick. In another embodiment, more than two input/steering mechanisms 102 may alternatively be included. In other embodiments, an aircraft may include a single input/steering mechanism 102, as the aircraft may not include an area for a co-pilot 122.

In addition to receiving user inputs 112, the control unit 104 may also be adapted to receive a plurality of signals representing real-time aircraft conditions. For example, the real-time aircraft condition signals may include aircraft speed signals 126, aircraft altitude signals 128, and aircraft attitude signals 130. In other embodiments, the real-time aircraft condition signals may include data related to conditions surrounding the aircraft, or "aircraft flight envelope" signals 131. Examples of aircraft flight envelope data include, but are not limited to, temperature, aircraft autoflight/autothrottle mode, airspeed, and altitude awareness. In any event, one or more of the real-time aircraft condition signals may be supplied from sensors (not shown) that may be disposed on the aircraft and are dedicated to the system 100 or shared with other systems in the aircraft, or supplied via one or more data buses within the aircraft.

The control unit 104 is further adapted to process one or more of the input signals 112, 126, 128, 130, 131 to provide one or more output signals 134, 136, 138 that are communicated to the user via the display device 110 or the input/steering mechanism 102 or to the flight actuation system 108. In this regard, the control unit 104 may be made up of at least a processor 132 that is in operable communication with the display device 110, the input/steering mechanism 102, and the flight actuation system 108. The processor 132 may be any one of numerous known general-purpose microprocessors or an application specific processor that operates in response to program instructions. In an embodiment, the processor 132 includes on-board RAM (random access memory) and on-board ROM (read only memory). The program instructions that control the processor 132 may be stored in either or both the RAM and the ROM. For example, the operating system software may be stored in the ROM, whereas various operating mode software routines and various operational parameters may be stored in the RAM. It will be appreciated that this is merely exemplary of one scheme for storing operating system software and software routines, and that various other storage schemes may be implemented. It will also be appreciated that the processor 132 may be implemented using various circuit other than a programmable processor. For example, digital logic circuits and analog signal processing circuits could also or alternatively be used.

In an embodiment, the processor 132 may include program instructions to obtain data that may not be provided by the input signals 112, 126, 128, 130, 131, if such additional data is needed to determine an output signal. In one example, the processor 132 may be in operable communication with the flight-related database 106 and configured, in response to the input signals 112, 126, 128, 130, 131, to selectively retrieve data therefrom. The flight-related database 106 may include various types of data such as terrain data, including elevation data representative of the terrain over which the aircraft is flying. The flight-related database 106 may also, or alternatively include various types of navigation-related data such as various flight plan related data including, waypoints, distances between waypoints, headings between waypoints, data related to different airports, navigational aids, obstructions, special use airspace data, political boundary data, communication frequencies, and aircraft approach information. Although the flight-related database 106 is shown as a single database separate from the processor 132, in other embodiments, the flight-related database 106 may include separate databases, all or portions of the database 106 could be loaded into the on-board RAM or ROM, integrally included in the processor 132, and/or RAM, and/or ROM. In another embodiment, the flight-related database 106 could be included as part of a device or system that is physically remote from the aircraft control system 100.

Based on the input signals 112, 126, 128, 130, 131 and/or retrieved data, the processor 132 may provide an output signal 134 to the display device 110 to display various images and data, in both a graphical and a textual format and to thereby supply visual feedback to the user, in an embodiment. The display device 110 may be any one of numerous known displays suitable for rendering image and/or text data in a format viewable by the user. Suitable examples of such displays include, but are not limited to various cathode ray tube (CRT) displays, and various flat panel displays (e.g., various types of LCD (liquid crystal display) and TFT (thin film transistor) displays). The display device 110 may additionally be based on a panel mounted display, a head-up display projection, or other known display technologies.

In another embodiment, the processor 132 may receive an input signal 112 from the input/steering mechanism to provide an output signal 136 to the flight actuation system 108. For example, the processor 132, and hence the control unit 104, may be configured to supply a power output signal 136 to appropriate primary flight control surface actuators 142, 144, 146 that may make up part of the flight actuation system 108. The actuators 142, 144, 146, in response, may move to an appropriate control surface position, to thereby implement a desired directional movement of the aircraft.

In yet another embodiment, the control unit 104 may supply an output signal, shown in FIG. 1 as a feedback signal 138, to the input/steering mechanism 102. The feedback signal 138 may be used to prompt the pilot 120 or co-pilot 122 to solicit a particular reaction, such as providing an additional input to the system 100. For example, in an embodiment, the input/steering mechanism 102 (e.g. either the steering mechanism 116 or the hub 118) may include a tactile generator 148 that is in operable communication with the processor 132 and is adapted to vibrate or otherwise provide a physical disturbance to a user, in response to the feedback signal 138. If included in the steering mechanism 116, the tactile generator 148 may cause the steering mechanism 116 to vibrate. If included in the hub 118, the tactile generator 148 may cause a portion of the hub 118 to vibrate, or may cause a surface of the hub 118 to move or change texture. Thus, when, for instance, the user's palm or thumb is in physical contact with the surface of the hub 118, the user's palm or thumb may experience a tactile sensation that the user may recognize as a prompt to react. The physical disturbance may vary in magnitude, based on a position of the steering mechanism 116 or the hub 118 or on the aircraft conditions as represented by each of the received aircraft condition signals 112, 126, 128, 130, 131.

In embodiments in which the user may be prompted to supply additional information, the user may do so using the alphanumeric keyboard 124, which as mentioned above may be positioned on the hub 118 such that keystrokes may be primarily made by the user's thumbs. The alphanumeric keyboard 124 may include a QWERTY-based keyboard, in an embodiment. A QWERTY-based keyboard may be a standard arrangement in which the characters of Roman script are laid out. In another embodiment, the alphanumeric keyboard 124 also may include a numerical keypad incorporated into or disposed adjacent to the QWERTY-based keyboard.

In yet another embodiment, the alphanumeric keyboard 124 may be a physical keyboard disposed in the hub 118. In still another embodiment, a means for projecting at least a portion of a virtual keyboard on a face 119 of the hub 118 and a means for sensing movement of a user's thumb or hand across the virtual keyboard to produce the input signal 102 may be included to form a virtual keyboard. For example, one or more optical sensors embedded in, coupled to, or disposed proximate to the hub 118. In an embodiment, the optical sensors may further operate with one or more image-rendering screens or other devices for providing an image of alphanumeric keys on the hub face 119. In such case, the means for projecting at least a portion of the virtual keyboard may be further adapted to project the virtual keyboard such that the virtual keyboard moves relative to a movement of the hub 118, in an embodiment. In another embodiment, the means for projecting at least a portion of the virtual keyboard may be further adapted to project the virtual keyboard such that the virtual keyboard does not move relative to a movement of the hub.

Additionally, or alternatively, the image of alphanumeric keys may be rendered on the display device 110. In an embodiment, the optical sensors may cause the image-rendering screens or other devices for providing the alphanumeric keys on the hub face 119 or on the display device 110 to render an entire alphanumeric keyboard or a portion of the keyboard, such as particular keys over which the user's thumbs are disposed over, in order to conserve display space. In some embodiments, a user may place his or her fingers over each key, and in an embodiment, each key over which a finger is placed may be displayed in a particular color, shape, or size associating a particular finger and a particular displayed key. To further conserve display space, the means for projecting at least a portion of the virtual keyboard may be toggled with a means for projecting at least a portion of an instrument panel. For example, the user may select a keyboard mode in which the means for projecting at least a portion of the virtual keyboard projects the keyboard, and an instrument mode in which the means for projecting at least a portion of an instrument panel displays the instrument panel. Similar to the virtual keyboard, the instrument panel may be displayed either on the hub face 119 or on the display device 110. In an embodiment in which the instrument panel is displayed on the hub face 119, the means for projecting at least a portion of the instrument panel may be further adapted to project the instrument panel such that it remains in position despite rotational movement of the hub. In yet another embodiment, the means for projecting at least a portion of the virtual keyboard may be toggled with a means for projecting shortcut keys. As used herein, a shortcut key may be a physical or virtual button that indicates a function that may be useful to the user, such as a "DirectTo", "Show", "Nav", "Com", or other function. When the shortcut key is selected by the user, the means for projecting at least a portion of the instrument panel may generate and display an image corresponding to the shortcut key on the hub face 119 or the display device 110. In an example, the user may select a shortcut key mode in which the means for projecting the shortcut keys displays one or more shortcut keys on the hub face 119 or the display device 110. In another embodiment, toggling may be achieved by providing a physical or virtual hotkey button.

Figure 2:
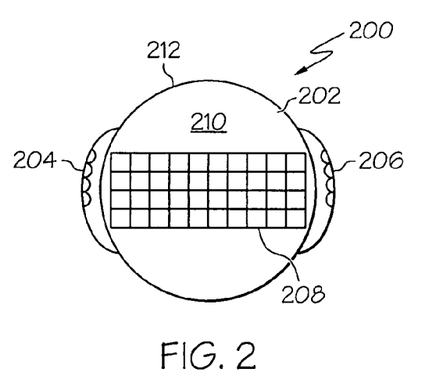
FIG. 2 is a simplified top view of a yoke that may be implemented into the system shown in FIG. 1, according to an embodiment.

Various embodiments of the alphanumeric keyboard 124 and the hub 118 may be suitable. In one example, the hub 118 may be part of an aircraft yoke including the alphanumeric keyboard 124 thereon. FIG. 2 is a simplified top view of a yoke 200 that may be implemented into the system 100 shown in FIG. 1, according to an embodiment. The yoke 200 includes a hub 202, an alphanumeric keyboard 208, and one or more grip surfaces 204, 206. The hub 202 may be defined herein as a housing and may be generally circular in shape, in an embodiment. In other embodiments, the hub 202 may be ovular, square, rectangular, or may have any other shape suitable for forming a face 210 and having an outer periphery 212. The face 210, as referred to herein, may be defined as a surface of the hub 202 having a largest area with which the user visually interacts. In an embodiment, the face 210 includes the alphanumeric keyboard 208 thereon. According to an embodiment, the alphanumeric keyboard 208 is embedded into the hub face 210. In another embodiment, the alphanumeric keyboard 208 is integrally formed as part of the hub 202. In any case, the alphanumeric keyboard 208, either via keys on the keyboard 208 or via sensed movement by optical sensors, is adapted to detect and produce the user input 112 (FIG. 1).

Figure 3:
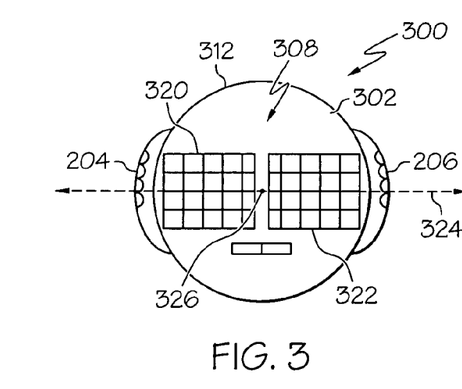
FIG. 3 is a simplified top view of a yoke that may be implemented into the system shown in FIG. 1, according to another embodiment.

Though the alphanumeric keyboard 208 in FIG. 2 is shown as being a single keyboard, the keyboard 208 may alternatively be split into sections. FIG. 3 is a top view of a yoke 300 including such a split keyboard 308, according to an embodiment. Here, a first section 320 is shown adjacent one side of a hub 302, while a second section 322 is disposed adjacent an opposite side of the hub 302. The sections 320, 322 may be disposed along a single axis 324 (shown as a dotted line) that extends through a center 326 of the hub 302, as shown in FIG. 3, in an embodiment. In another embodiment, the sections 320, 322 may be angled relative to the axis 324. Although two sections 320, 322 are shown, more may alternatively be included. Moreover, although each section 320, 322 is shown as being positioned proximate an outer periphery 312 of the hub 302, the sections 320, 322 may disposed closer to the center 326 of the hub 302, in other embodiments.

Figure 4:
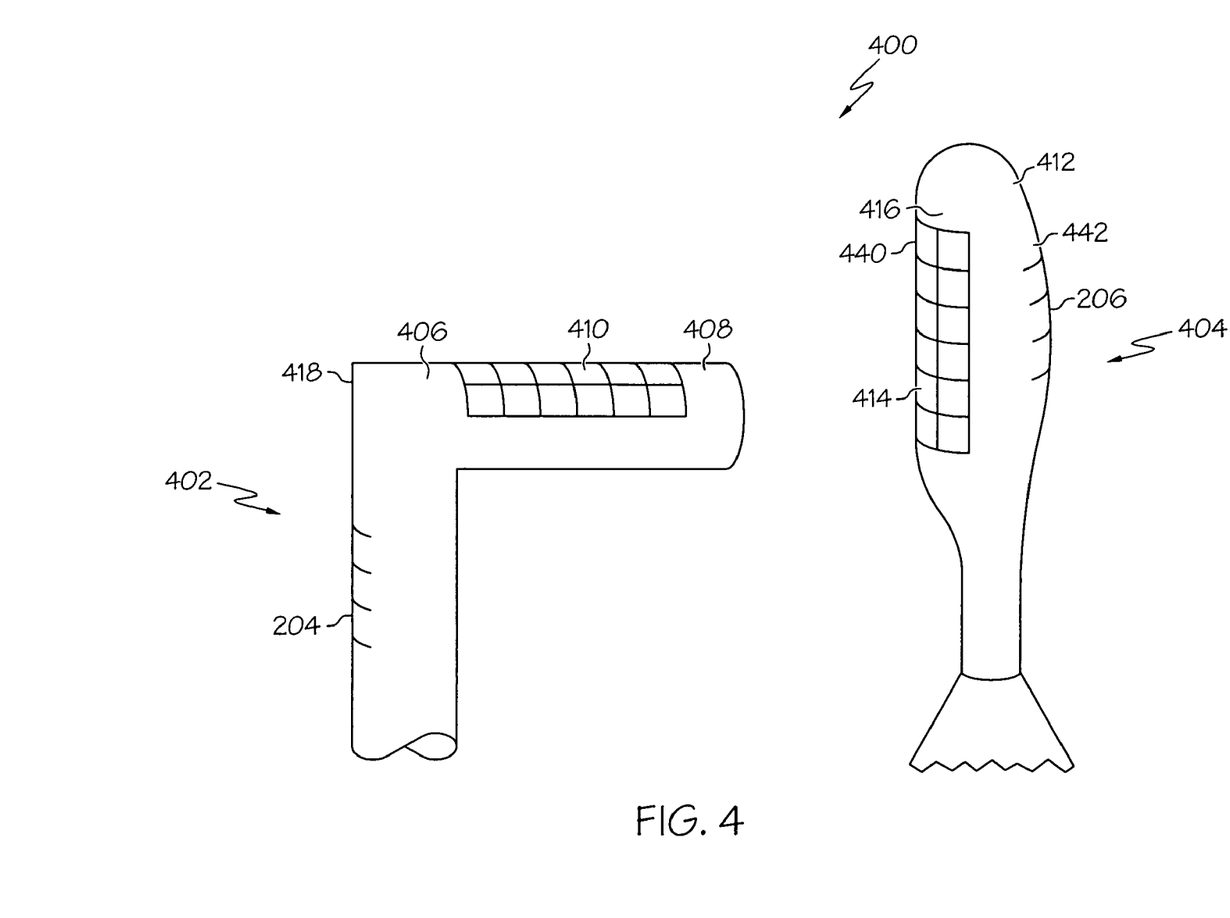
FIG. 4 is a simplified top view of an input/steering mechanism including two hubs that may be implemented into the system shown in FIG. 1, according to another embodiment.

In another example, the alphanumeric keyboard 208 may be split and placed on two different hubs. FIG. 4 is a side view of an input/steering mechanism 400 having two hubs 406, 412, according to an embodiment. In an embodiment, the first hub 406 may be included on a throttle 402 and may include a face 408 and at least a first portion 410 of an alphanumeric keyboard on its face 408. The first portion 410 of the alphanumeric keyboard may be adapted to receive a manual input from a user and to transmit an output signal to the aircraft control system in response to the manual input. The second hub 412 may be included on a stick 404 disposed proximate to the throttle 402 and may include a second portion 414 of the alphanumeric keyboard disposed on its face 416. The second portion of the alphanumeric keyboard may be adapted to receive a manual input from the user and to transmit an output signal to the aircraft control system in response to the manual input.

In an embodiment, the each portion 410, 414 of the alphanumeric keyboard may include one half of a keyboard. In another embodiment, each portion 410, 414 of the alphanumeric keyboard may include a few keys from the keyboard. Additionally, each portion 410, 414 may include a portion of a physical keyboard, in an embodiment. Alternatively, the first portion 410 of the alphanumeric keyboard may comprise a means for projecting a first portion of a virtual keyboard on the face 408 of the first hub 406 and a means for sensing movement of the thumb of the left hand across the first portion 410 of the virtual keyboard to produce a left hand output signal, and the second portion 414 of the alphanumeric keyboard comprises a means for projecting a second portion of a virtual keyboard on the face 416 of the second hub 412 and a means for sensing movement of the thumb of the right hand across the second portion of the virtual keyboard to produce a right hand output signal, in an embodiment. In such case, the processor 132 (FIG. 1) may be further adapted to receive the left hand output signal from the means for projecting the first portion of the virtual keyboard and to produce a third output signal in response thereto and to receive the right hand output signal from the means for projecting the second portion of the virtual keyboard and to produce a fourth output signal in response thereto, in an embodiment. The third and fourth output signals may be used to display the virtual keyboard portions either on the first and second hubs 406, 412, according to an embodiment. In another embodiment, the display device 110 (FIG. 1) may be adapted to display an image in response to the third output signal and the fourth output signal, wherein the third output signal comprises a command to display an image including a portion of the first portion of the virtual keyboard over which the thumb of the left hand is disposed and the fourth output signal comprises a command to display an image including a portion of the second portion of the virtual keyboard over which the thumb of the right hand is disposed.

Figure 5:
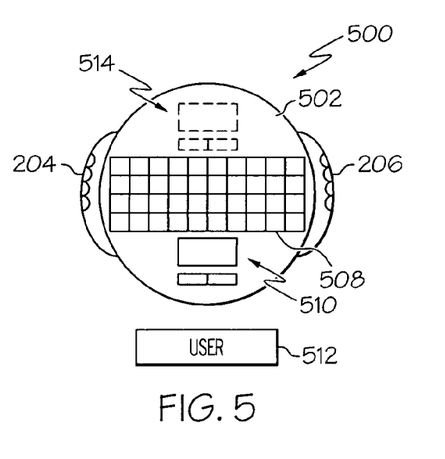
FIG. 5 is a simplified top view of a yoke that may be implemented into the system shown in FIG. 1, according to another embodiment.

In addition to the alphanumeric keyboard 208, 308, the hub 202, 302, 406, 412 may include other user input devices, in some embodiments. FIG. 5 is a top view of a yoke 500 according to another embodiment. Here, the yoke 500 is similar to yoke 200, except that a cursor control device (CCD) 510 adapted to translate a two-dimensional motion of a device to an output signal is included. In an embodiment, the CCD 510 is a disposed on a hub 502 between an alphanumeric keyboard 508 and a user 512. In another embodiment, a CCD 514 (shown in phantom) may alternatively or additionally be disposed on the hub 502 on an opposite side of the keyboard 508 relative to the user 512. Although the CCD 510 is shown as a touchpad in FIG. 5, other configurations may be alternatively used in other embodiments.

Figure 6:
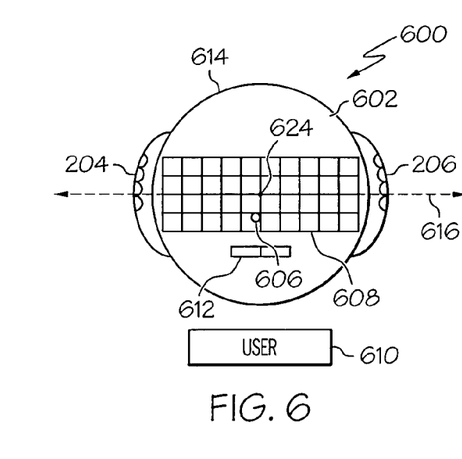
FIG. 6 is a simplified side view of a yoke that may be implemented into the system shown in FIG. 1, according to another embodiment.

FIG. 6 is a top view of a yoke 600, according to another embodiment. The yoke 600 has a hub 602 that includes a track button mouse 606 incorporated as part of an alphanumeric keyboard 608 and one or additional buttons 612 disposed between the keyboard 608 and a user 610. In other embodiments, switches, knobs, or other devices suitable for allowing the user to, among other things, move a cursor symbol on the display device 110 (FIG. 1) may alternatively be implemented.

Referring to each of FIGS. 2-6, grip surfaces 204, 206 are included on the hubs 202, 302, 406, 412, 502, 602 in various embodiments, such that the alphanumeric keyboard and portions thereof 208, 308, 410, 414, 508, 608 are disposed therebetween. For convenience, the grip surfaces 204, 206 will be described with continued reference to FIG. 6. However, it will be appreciated that the embodiments may be applied to any configuration of the hubs 202, 302, 406, 412, 502, 602. In any case, the grip surfaces 204, 206 are disposed such that one or both thumbs of the user 610 are position to rest in proximity to at least a portion of the alphanumeric keyboard 608 when one or more fingers of the user 610 grips the grip surfaces 204, 206. In an embodiment, the grip surfaces 204, 206 are formed on the outer periphery 614 of the hub 602 and include contoured surfaces of the hub 602 that correspond with one or more fingers of the user 610. In one example, a first grip surface 204 is formed on the outer periphery 614 of the hub 602 on a first side and is contoured to correspond with a left hand of the user 610, while a second grip surface 206 is formed on the outer periphery 614 of the hub 602 on an opposite side of the first grip surface 204 and contoured to correspond with one or more fingers of a right hand of the user 610. In this embodiment, although the grip surfaces 204, 206 are shown as being located along an axis 616 that extends through a center 624 of the hub 602, the grip surfaces 204, 206 may alternatively be positioned along other portions of the outer periphery 614. For example, each of the grip surfaces 204, 206 may be positioned at a first angle and a second angle, respectively, relative to the axis 616. The first and the second angles may be in a range of between about 30 degrees and about 180 degrees, in an embodiment. In another embodiment, the first and the second angles may be about 90 degrees. Though the first and the second angles may be substantially equal (e.g., ±5°), they may be unequal in other embodiments. Additionally, the grip surfaces 204, 206 may be positioned either on a side of the keyboard 608 that is closer to the user (e.g., below axis 516) or on a side of the keyboard that is further from the user (e.g., above axis 516).

Figure 7:
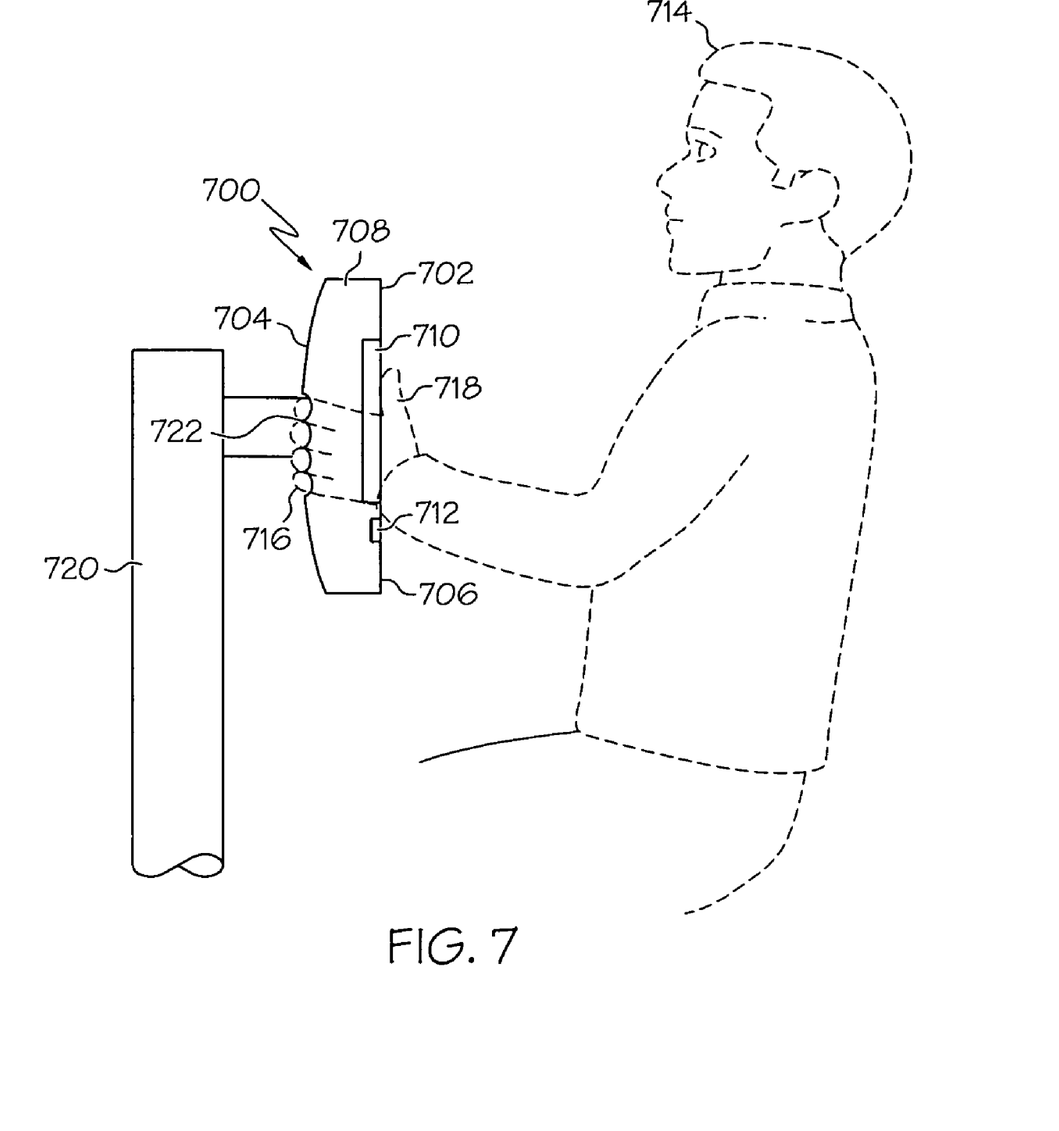
FIG. 7 is a simplified top view of a yoke that may be implemented into the system shown in FIG. 1, according to another embodiment.

In another embodiment, the grip surfaces 204, 206 may be disposed on a back side of the hub 602. FIG. 7 is a side view of such a yoke 700, according to an embodiment. Here, yoke 700 includes a first or front side 702 and a second or back side 704. The first side 702 includes a face 706 on a front of a hub 708 and an alphanumeric keyboard 710 and a CCD 712 thereon. As shown in FIG. 7, a user 714 (shown in phantom) may have fingers 716 that rest on the second or back side 704 of the yoke 700 such that the user's thumbs 718 may be used to input keystrokes into the alphanumeric keyboard 710 on the first or front side 702. The second side 704 of the yoke 700 is coupled to a steering mechanism 720 and includes grip surfaces 722 formed thereon. Similar to other embodiments, the grip surfaces 722 are contoured to correspond with one or more fingers of a hand of the user 714 and are positioned such that a thumb of the user 714 is positioned to rest in proximity to at least a portion of the alphanumeric keyboard 710.

Figure 8:
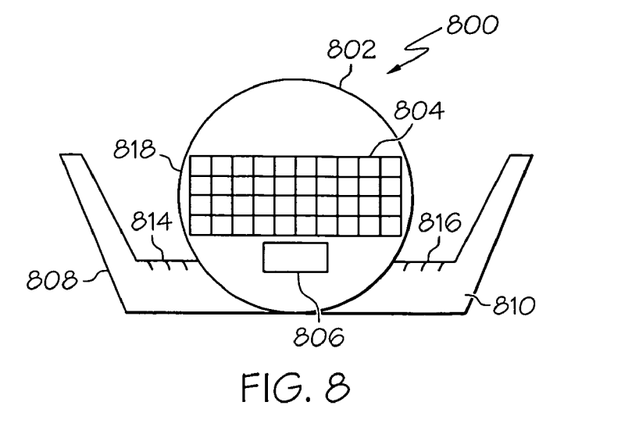
FIG. 8 is a simplified top view of a yoke that may be implemented into the system shown in FIG. 1, according to another embodiment.

According to another embodiment, the grip surfaces alternatively or additionally may be positioned radially outwardly relative to a hub. FIG. 8 is a top view of a yoke 800 according to such an embodiment. In an embodiment, the yoke 800 includes a hub 802 on which an alphanumeric keyboard 804 and a CCD 806 are disposed and two arms 808, 810 that extend laterally from the hub 802. The arms 808, 810 may be straight rods that extend from the hub 802, in an embodiment. Alternatively, the arms 808, 810 may be L-shaped, as shown in FIG. 8, or may have a different shape suitable for providing a surface for the user to grasp. In an embodiment, sections of the arms 808, 810 closest to the hub 802 may include grip surfaces 814, 816 so that a user's hands may rest thereon, while the user's thumbs may contact the alphanumeric keyboard 804. For example, the first arm 808 may extend laterally from the hub 802 in a first direction and may include the first grip surface 814 formed thereon, while the second arm 810 extending laterally from the hub 802 in a second direction and may include the second grip surface 816 formed thereon. In another embodiment, the grip surfaces 814, 816 may be positioned on other sections of the arms 808, 810. The arms 808, 810 may be positioned along an outer periphery 818 of the hub 802 at a location configured to be closest to a user, in an embodiment, as shown in FIG. 8. However, this may not be the case in every configuration.

Figure 9:
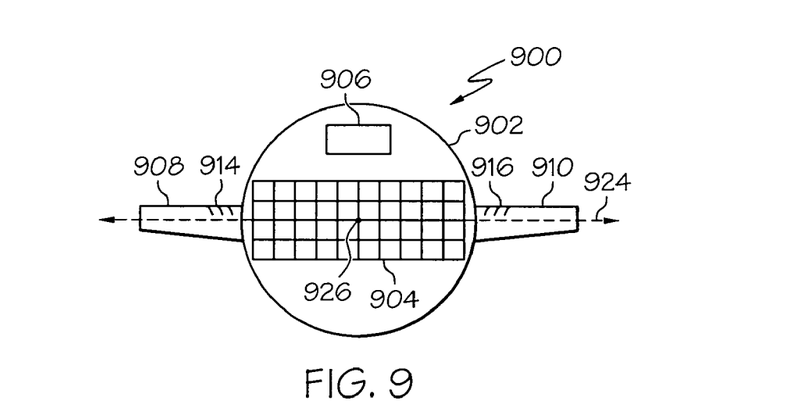
FIG. 9 is a simplified top view of a yoke that may be implemented into the system shown in FIG. 1, according to another embodiment.

In another embodiment, shown in FIG. 9, a yoke 900 includes arms 908, 910 that extend laterally from a hub 902, where each arm 908, 910 is positioned along an axis 924 that extends substantially through a center 926 of the hub 902. The arms 908, 910 may include corresponding grip surfaces 914, 916 thereon. An alphanumeric keyboard 904 and a CCD 906 may be disposed between the arms 908, 910.

Figure 10:
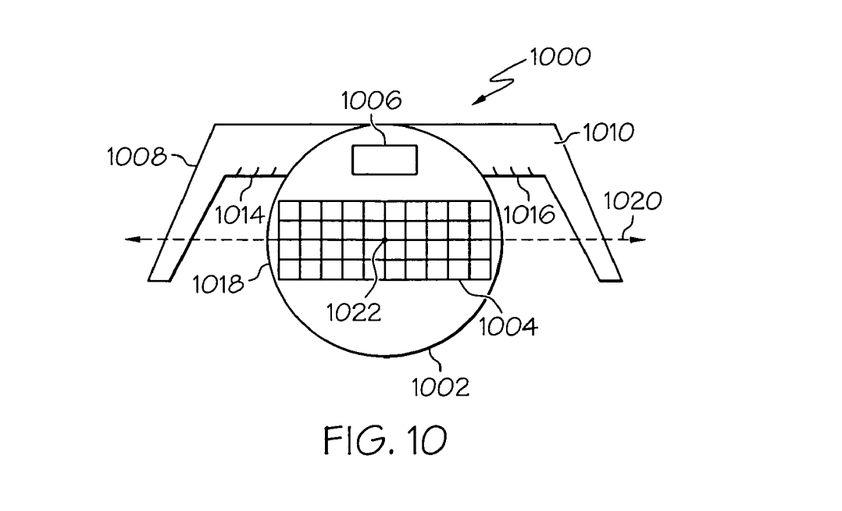
FIG. 10 is a simplified top view of a yoke that may be implemented into the system shown in FIG. 1, according to another embodiment.

In still another embodiment shown in FIG. 10, the arms 1008, 1010 extend laterally from a hub 1002 and may be positioned on an outer periphery 1018 of the hub 1002 at a position away from an axis 1020 through a center 1022 of hub 1002 (e.g., above or below axis 1020). In an embodiment in which the arms 1008, 1010 are L-shaped, portions of the arms 1008, 1010 may extend toward the user, as shown, or away from the user. Grip surfaces 1014, 1016 may be disposed on the arms 1008, 1010, and an alphanumeric keyboard 1004 and a CCD 1006 may be disposed between the arms 1008, 1010.

Returning to FIG. 4, in an embodiment in which the throttle 402 and stick 404 are included, grip surfaces 204, 206 may be positioned on an outer periphery 418 of one hub 406 and on a side of one hub 412. In an embodiment, the throttle 402 may include an arm that extends axially from the outer periphery 418 of the hub 406 and a first grip surface 204 may be formed thereon. In another embodiment, the stick 404 may include a second grip surface 206 on a first side 440, and the second portion 414 of the keyboard on a second, opposite side 442.

Aircraft control systems have now been provided that reduce effort of the flight crew in interacting with the displays and the flight control system on an aircraft. The systems simplify a means by which the flight crew inputs data into a flight control system. Additionally, the input/steering mechanisms described above may be relatively inexpensive and simple to implement into new and existing aircraft.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An input/steering mechanism for use with an aircraft control system, the input/steering mechanism comprising:
   a first hub;
   at least a first portion of an alphanumeric keyboard disposed on a face of the first hub and adapted to receive a manual input from a user and to transmit an output signal to the aircraft control system in response to the manual input;
   a first grip surface formed on an outer periphery of the first hub and contoured to correspond with one or more fingers of the user, the first grip surface disposed such that a thumb of the user is positioned to rest in proximity to the alphanumeric keyboard when the one or more fingers grip the first grip surface;
   a throttle adapted to include the first hub, a first portion of the alphanumeric keyboard and the first grip surface, the first grip surface contoured to correspond with one or more fingers of a left hand of a user; and
   a stick proximate to the throttle, the stick including:
      a second hub,
      a second portion of the alphanumeric keyboard disposed on a face of the second hub and adapted to receive a manual input from the user and to transmit an output signal to the aircraft control system in response to the manual input, and
      a second grip surface formed on an outer periphery of the second hub and contoured to correspond with one or more fingers of the right hand of the user, the second grip surface disposed such that a thumb of the user is positioned to rest in proximity to at least a portion of the second portion of the alphanumeric keyboard when the one or more fingers grip the second grip surface.

2. The input/steering mechanism of claim 1, further comprising:
   a steering mechanism to which the first hub is mounted, the steering mechanism capable of a rotational motion, an axial motion, and a radial motion, and adapted to produce an output signal in response to the motion and to transmit the output signal to the aircraft control system.

3. The input/steering mechanism of claim 1, wherein:
   the first grip surface is contoured to correspond with one or more fingers of a left hand of the user; and
   the input/steering mechanism further comprises a second grip surface formed on the outer periphery of the first hub on an opposite side of the first grip surface, the second grip surface contoured to correspond with one or more fingers of a right hand of the user.

4. The input/steering mechanism of claim 3, wherein the alphanumeric keyboard is located between the first grip surface and the second grip surface.

5. The input/steering mechanism of claim 1, further comprising a first arm extending laterally from the first hub, the first arm including the first grip surface formed thereon.

6. The input/steering mechanism of claim 1, wherein:
   the first grip surface is contoured to correspond with one or more fingers of a left hand of the user; and
   the input/steering mechanism further comprises:

a first arm extending laterally from the first hub, the first arm including the first grip surface formed thereon; and
a second arm extending laterally from the hub, the second arm including a second grip surface formed on the second side of the first hub and contoured to correspond with one or more fingers of a right hand of the user.

7. The input/steering mechanism of claim 1, further comprising an input device disposed on the first hub adjacent to the first portion of the alphanumeric keyboard, the input device adapted to translate a two-dimensional motion of the input device to an output signal.

8. The input/steering mechanism of claim 7, wherein the input device comprises a track button mouse.

9. The input/steering mechanism of claim 7, wherein the input device comprises a touchpad.

10. The input/steering mechanism of claim 1, wherein the at least a first portion of the alphanumeric keyboard comprises at least a portion of a QWERTY-based keyboard.

11. The input/steering mechanism of claim 1, wherein the at least a first portion of the alphanumeric keyboard comprises a means for projecting at least a portion of a virtual keyboard on the face of the first hub and a means for sensing movement of the thumb across the portion of the virtual keyboard to produce the output signal.

12. The input/steering mechanism of claim 11, wherein the means for projecting at least a portion of the virtual keyboard is further adapted to project the virtual keyboard such that the virtual keyboard moves relative to a movement of the first hub.

13. The input/steering mechanism of claim 11, wherein the means for projecting at least a portion of the virtual keyboard is further adapted to project the virtual keyboard such that the virtual keyboard does not move relative to a movement of the first hub.

14. The input/steering mechanism of claim 1, further comprising a tactile generator adapted to provide a physical disturbance to a user, the tactile generator disposed on the first hub.

15. The input/steering mechanism of claim 1, further comprising a yoke, wherein the yoke includes the first hub, the portion of the alphanumeric keyboard, and the first grip surface.

16. The input/steering mechanism of claim 1, wherein:
the first portion of the alphanumeric keyboard comprises a means for projecting a first portion of a virtual keyboard on the face of the first hub and a means for sensing movement of the thumb of the left hand across the first portion of the virtual keyboard to produce a left hand output signal; and
the second portion of the alphanumeric keyboard comprises a means for projecting a second portion of a virtual keyboard on the face of the second hub and a means for sensing movement of the thumb of the right hand across the second portion of the virtual keyboard to produce a right hand output signal.

17. An aircraft control system comprising:
an input/steering mechanism including:
a first hub,
at least a first portion of an alphanumeric keyboard disposed on a face of the first hub and adapted to receive a manual input from a user and to transmit a first output signal to the aircraft control system in response to the manual input, and
a first grip surface formed on an outer periphery of the first hub and contoured to correspond with one or more fingers of the user, the first grip surface disposed such that a thumb of the user is positioned to rest in proximity to the alphanumeric keyboard when the one or more fingers grip the first grip surface;
a throttle adapted to include the first hub, the at least a first portion of the alphanumeric keyboard, and the first grip surface, the first grip surface contoured to correspond with one or more fingers of a left hand of a user; and
a stick proximate to the throttle, the stick including:
a second hub,
a second portion of the alphanumeric keyboard disposed on a face of the second hub and adapted to receive a manual input from the user and to transmit a third output signal to the aircraft control system in response to the manual input, and
a second grip surface formed on an outer periphery of the second hub and contoured to correspond with one or more fingers of the right hand of the user, the second grip surface disposed such that a thumb of the user is positioned to rest in proximity to at least a portion of the second portion of the alphanumeric keyboard when the one or more fingers grip the second grip surface,
a processor in operable communication with the input/steering mechanism, the processor adapted to receive the first output signal from the input/steering mechanism and to produce a second output signal in response thereto, the processor further adapted to receive the third output signal and to produce a fourth output signal in response thereto; and
a display in operable communication with the processor and adapted to display one or more images in response to the second output signal and the third output signal.

18. The aircraft control system of claim 17, further comprising:
a steering mechanism to which the first hub is mounted, the steering mechanism capable of a rotational motion, an axial motion, and a radial motion, and adapted to produce a third output signal in response to the motion and to transmit the third output signal to the aircraft control system.

19. The aircraft control system of claim 17, wherein:
the first grip surface is contoured to correspond with one or more fingers of a left hand of the user; and
the input/steering mechanism further comprises a second grip surface formed on the outer periphery of the first hub on an opposite side of the first grip surface, the second grip surface contoured to correspond with one or more fingers of a right hand of the user.

20. The aircraft control system of claim 17, wherein:
the first grip surface is contoured to correspond with one or more fingers of a left hand of the user; and
the input/steering mechanism further comprises:
a first arm extending laterally from the first hub, the first arm including the first grip surface formed thereon; and
a second arm extending laterally from the first hub, the second arm including a second grip surface formed on the second side of the first hub and contoured to correspond with one or more fingers of a right hand of the user.

21. The aircraft control system of claim 17, further comprising an input device disposed on the first hub adjacent to the first portion of the alphanumeric keyboard, the input device adapted to translate a two-dimensional motion of the input device to a fourth output signal to the processor.

22. The aircraft control system of claim 17, wherein the first portion of the alphanumeric keyboard comprises a portion of a QWERTY-based keyboard.

23. The aircraft control system of claim 17, wherein the at least a first portion of the alphanumeric keyboard comprises a means for projecting at least a portion of a virtual keyboard on the face of the first hub and a means for sensing movement across the portion of the virtual keyboard to produce the first output signal to the processor.

24. The aircraft control system of claim 23, wherein the means for projecting at least a portion of the virtual keyboard is further adapted to project the virtual keyboard such that the virtual keyboard moves relative to a movement of the first hub.

25. The aircraft control system of claim 23, wherein the means for projecting at least a portion of the virtual keyboard is further adapted to project the virtual keyboard such that the virtual keyboard does not move relative to a movement of the first hub.

26. The aircraft control system of claim 17, further comprising a tactile generator in operable communication with the processor and adapted to provide a physical disturbance to a user, in response to the second output signal received from the processor.

27. The aircraft control system of claim 17, further comprising a yoke, wherein the yoke includes the first hub, the at least a first portion of the alphanumeric keyboard, and the first grip surface.

28. The aircraft control system of claim 17, wherein:
the first portion of the alphanumeric keyboard comprises a means for projecting a first portion of a virtual keyboard on the face of the first hub and a means for sensing movement of the thumb of the left hand across the first portion of the virtual keyboard to produce a left hand output signal; and
the second portion of the alphanumeric keyboard comprises a means for projecting a second portion of a virtual keyboard on the face of the second hub and a means for sensing movement of the thumb of the right hand across the second portion of the virtual keyboard to produce a right hand output signal.

29. The aircraft control system of claim 28, wherein:
the processor is further adapted:
  to receive the left hand output signal from the means for projecting the first portion of the virtual keyboard and to produce a fifth output signal in response thereto, and
  to receive the right hand output signal from the means for projecting the second portion of the virtual keyboard and to produce a sixth output signal in response thereto, and
the display is further adapted to display an image in response to the fifth output signal and the sixth output signal, wherein the fifth output signal comprises a command to display an image including a portion of the first portion of the virtual keyboard over which the thumb of the left hand is disposed and the sixth output signal comprises a command to display an image including a portion of the second portion of the virtual keyboard over which the thumb of the right hand is disposed.

* * * * *